Figure 1:
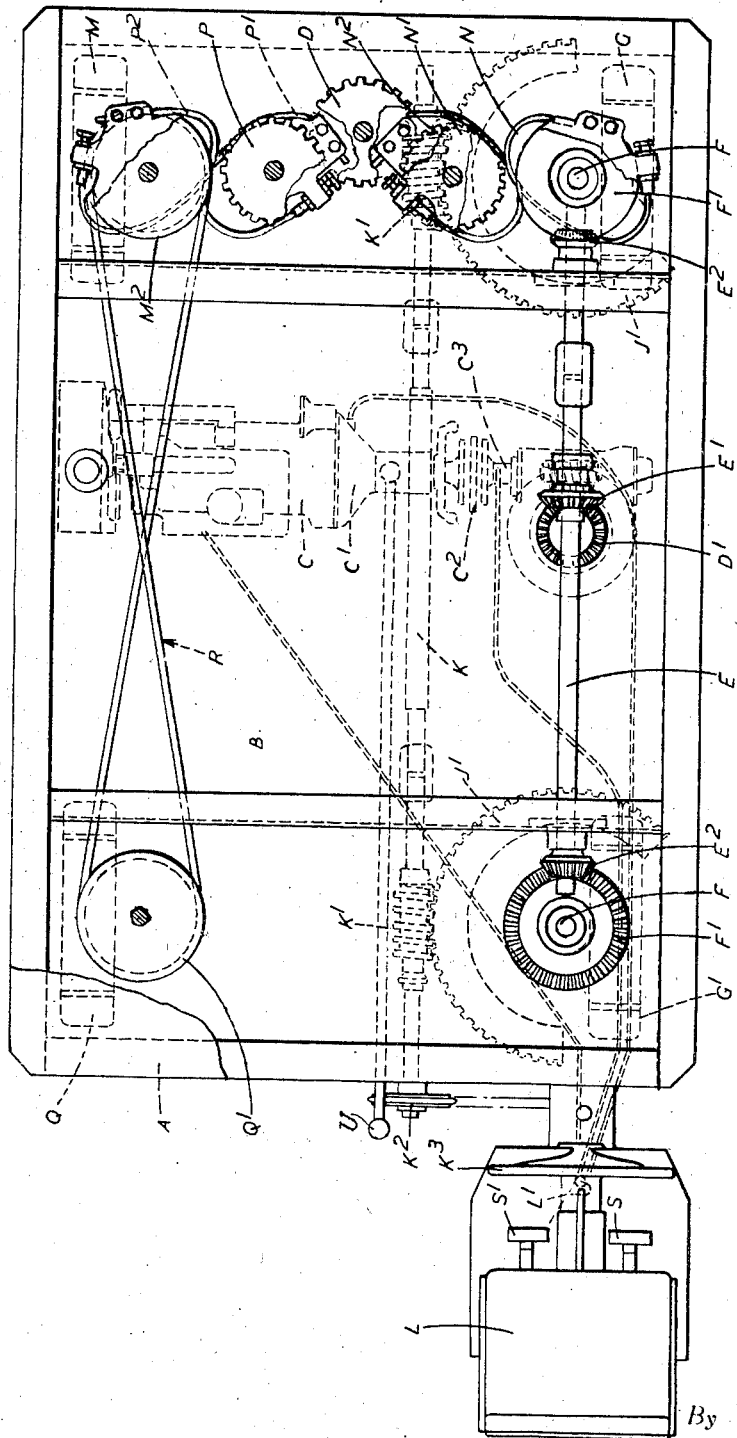

July 1, 1947.  A. S. STOKES  2,423,266
SELF-PROPELLED VEHICLE
Filed Sept. 18, 1944  3 Sheets-Sheet 1

Inventor
A.S. STOKES
By
Attorneys

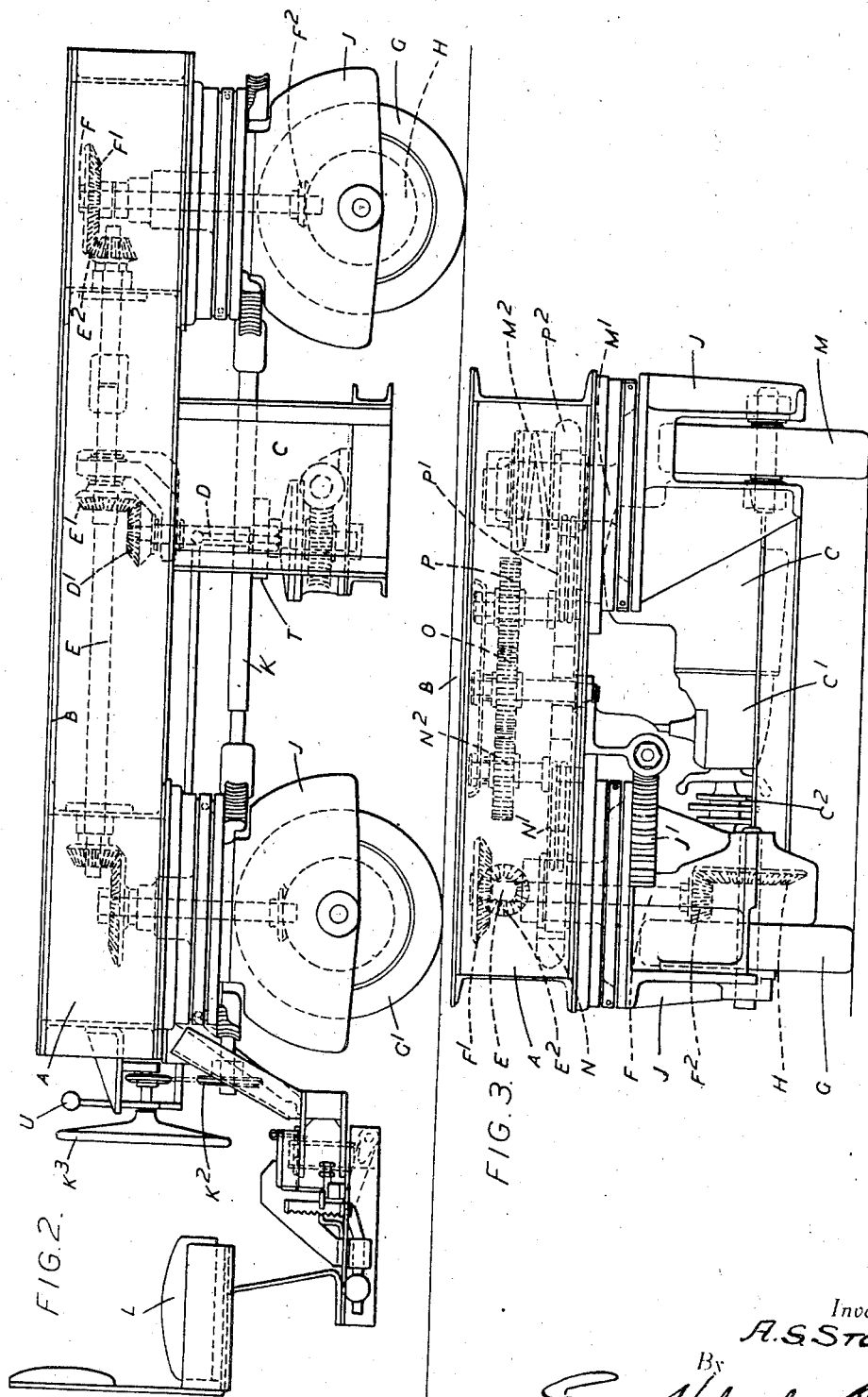

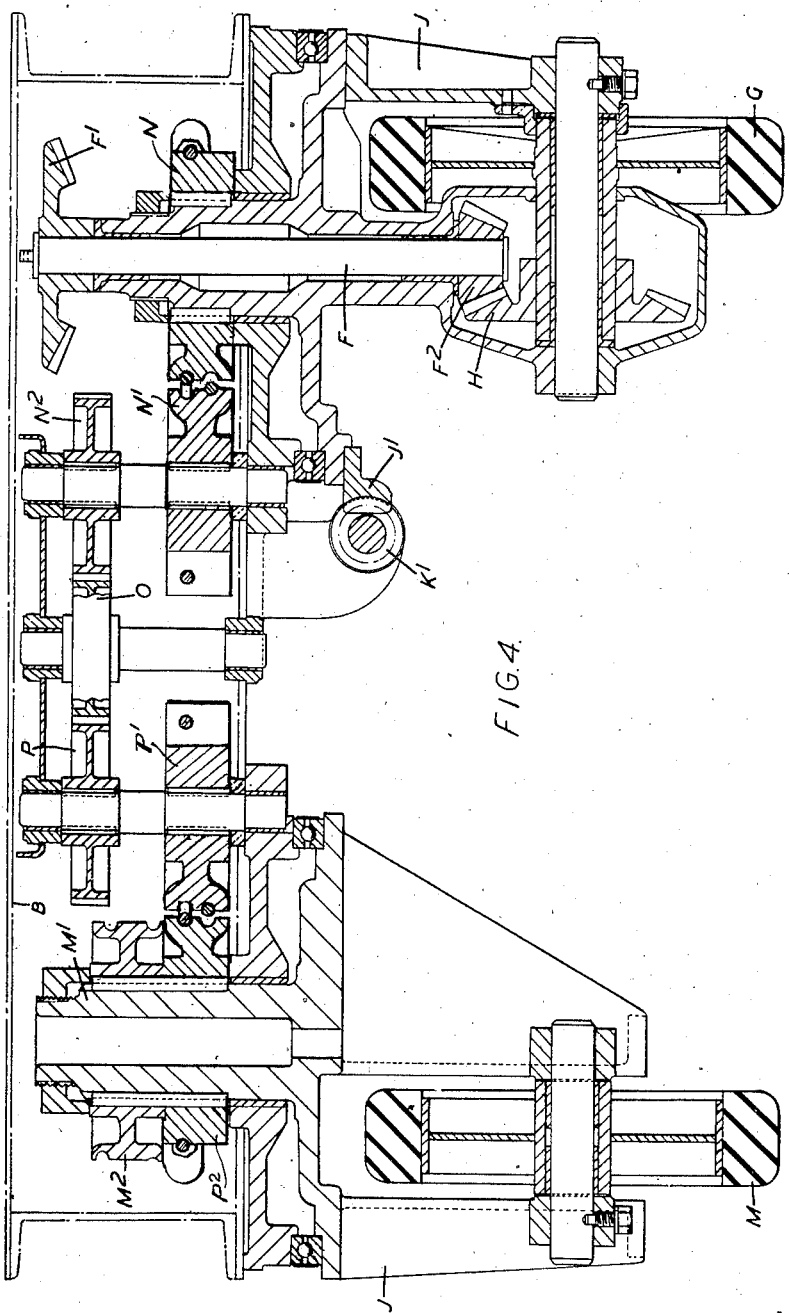

Patented July 1, 1947

2,423,266

UNITED STATES PATENT OFFICE 2,423,266

SELF-PROPELLED VEHICLE

Antony Scott Stokes, Ipswich, England, assignor to Ransomes & Rapier Limited, Ipswich, England, a company of Great Britain Application September 18, 1944, Serial No. 554,707
In Great Britain July 20, 1943

5 Claims. (Cl. 180—42)

This invention relates to self-propelled vehicles of the kind supported upon a pair of steered wheels at each end so that there is a wheel at or near each corner of an approximately rectangular chassis.

The object of the invention is to provide satisfactory means for transmitting drive to the road wheels so that the steering gear will always operate in the desired manner and a differential gear will not be required. The invention is particularly applicable to trolleys such, for example, as those which carry mobile cranes in which the post of the steering wheel for the time being nearer the centre of any curve described by the trolley, will be turned through a greater angle than the associated or outer steering wheel of the same pair. In particular the invention is intended for use with such trolleys in which both the front and rear wheels are arranged to turn about their steering posts so that a full turning lock is obtained unrestricted by the limitations imposed by the use of the so-called Ackerman link rods.

According to this invention the trolley comprises a substantially rectangular frame, platform or chassis supported at each end upon a pair of steered road wheels, a single driving unit, a positive driving connection between this unit and the front and rear wheels on one side of the chassis such that these two wheels are driven at the same speed, an operative connection for imparting the appropriate steering movement of the wheel at one end of the trolley to its associated wheel at the same end, and a driving connection between this associated wheel and the corresponding wheel at the opposite end of the trolley.

Thus without providing a differential gear or duplicating the mechanism which fulfils the function of the steering link rod, the front and rear wheels on any one side of the trolley are always constrained to move at the same speed and to be turned for steering purposes to the same angular extent.

The particular mechanism used to transmit the drive to the two driven wheels and to transmit the steering movement may be varied. Thus a single power unit mounted between the front and rear axles may drive a propeller shaft extending parallel to the length of the chassis and geared to vertical driving shafts enclosed in tubular supports about the axes in which the steered road wheels turn.

The tubular supports of the steered road wheels may each carry a steering worm wheel or segment actuated by worms on a shaft extending parallel to the length of the chassis and one of these steered road wheels, for example the front wheel, is connected through suitable gearing, which in itself forms no part of the present invention, to its associated wheel at the same end of the vehicle so that whichever wheel is for the time being nearer the centre of any curve described by the trolley, is turned through a greater angle than the other wheel. The wheel at the opposite end of the vehicle, for example at the rear end of the vehicle which is not directly steered by the worm mechanism above described is connected to the corresponding wheel on the same side of the chassis but at the other end thereof by means of rope gearing, bevel pinion or other driving connection.

A trolley according to the invention may be designed to carry a crane but it may also be constructed in the form of a works trolley or truck which can be easily manoeuvred. In such a case a seat for the driver or operator is conveniently arranged at a lower level than the platform of the truck at one end of the vehicle but referred to hereafter as the rear end.

One construction as applied to a works truck or trolley is illustrated somewhat diagrammatically by way of example in the accompanying drawings, in which Figure 1 is a plan,
Figure 2 is a side elevation,
Figure 3 is an end elevation, and
Figure 4 is a similar view to Figure 3, but in section in a plane containing the pivoted axes of the two adjacent wheels.

The trolley illustrated comprises a substantially rectangular chassis A having a flat load-supporting platform B and a steered wheel at each corner. About midway in the length of the frame and on the under side of the platform is a power unit comprising an internal combustion engine C provided with a normal clutch and change speed gear housed in a gear box $C^1$ and provided with a flexible coupling $C^2$ by which it is connected to a transversely extending driving shaft $C^3$. The driving shaft is connected to a vertical transmission shaft D through worm gearing and the upper end of the shaft D carries a bevel pinion $D^1$ meshing with a driven pinion $E^1$ on a horizontally extending shaft E. Bevel pinions $E^2$ at each end of this horizontal shaft mesh with pinions $F^1$ on vertical posts F which carry at their lower ends pinions $F^2$ meshing with bevel pinions H on the axles of the road wheels G and $G^1$ respectively at the front and rear ends of the chassis.

Each of the road wheels G, $G^1$ is carried in a yoke J which can rotate about the vertical shafts F and the yokes carry worm segments $J^1$ meshing with worms $K^1$ on the ends of a steering shaft K. This shaft can be rotated through a sprocket and chain gear $K^2$ by a steering wheel $K^3$ at the rear end of the vehicle adjacent to a seat L for the driver. The worm $K^1$ at the front end of the shaft K is wound in the opposite direction to the corresponding worm at the rear end so that when the steering wheel $K^3$ is rotated, the front and rear wheels $G$, $G^1$ are turned about their steering posts in opposite directions.

The angular movements of the front wheel $G$ are transmitted to the associated front wheel $M$ through belt-connected cam mechanism indicated in Figures 1 and 3 which in itself forms no part of the present invention. This cam mechanism is so arranged that both wheels can have an unrestricted turning movement while the wheel nearer the centre of any curve being described by the chassis is turned through a greater angle than the other or outer wheel. In the example illustrated an elliptical cam $N$ on the tubular support of the yoke $J$ is connected to an intermediate cam $N^1$ by belting and the movements of the cam $N^1$ are transmitted by a toothed pinion $N^2$ through an idle pinion $O$ to a pinion $P$ which carries a cam $P^1$ similar to the cam $N^1$. The cam $P^1$ is connected by belting to an elliptical cam $P^2$ on the tubular support $M^1$ of the yoke which supports the front wheel $M$. Toothed cams which mesh with one another can be used instead of rope-connected cams or chains can be employed with toothed cams instead of ropes.

To enable the steering movements of the front wheel $M$ to be transmitted to the corresponding rear wheel $Q$, a pulley $M^2$ on the tubular support $M^1$ is connected by crossed belting $R$ to a corresponding pulley $Q^1$ on the tubular support of the rear wheel.

Thus it will be seen that steering is directly transmitted to the driven wheels $G$, $G^1$ by the worm shaft $K$ controlled by the steering wheel $K^3$, that the steering movement of the front wheel $G$ is transmitted through the cam mechanism to the other front wheel $M$ and the steering movement of the front wheel $M$ is transmitted by the belting $R$ to the back wheel $Q$. As a result the front and rear wheels $G$, $G^1$ on the same side of the chassis are simultaneously driven at the same speed from a single power unit $C$ and even if owing to slippery or uneven ground the drive cannot be satisfactorily transmitted through both wheels simultaneously, at least one of the driving wheels $G$, $G^1$ will always be effective.

The driver's seat $L$ is conveniently mounted to the chassis so as to turn about a vertical pivot $L^1$. The platform carrying the seat is provided with two pedals, one of which $S$ enables the clutch to be controlled through a flexible power transmission cable whilst the other pedal $S^1$ operates a brake $T$ on the vertical shaft $D$ through a similar cable. The lever $U$ by which the change speed gear is controlled is arranged near the steering wheel $K^3$ for operation by the left-hand of the driver and the throttle and other controls (not shown) may be mounted on the end of the chassis adjacent to the steering wheel.

Obviously instead of an internal combustion engine an electric motor drawing its power from storage batteries suitably housed below the platform may be used and the constructional details may be modified. For example, for very heavy loads the trolley may be provided with two or more axles at or near each end and instead of a single wheel, a castor or bogie assembly may be employed and turn about its supporting axle through mechanism of the kind already described.

Should an unlimited turning movement not be required the front driven wheel may be connected to the undriven wheel on the opposite side by a simple belt or link mechanism of a known type instead of through the cam and belting illustrated.

What I claim as my invention and desire to secure by Letters Patent is:

1. A trolley comprising a substantially rectangular chassis or platform supported at each end upon a pair of steered road wheels, operative connections between the road wheels for imparting appropriate steering movements to the two wheels at one end of the trolley and in the same direction and to maintain their axes meeting at approximately the centre of turning of the vehicle, similar steering movements in the opposite rotational direction to the two wheels at the other end of the trolley, a single power unit and a positive driving connection between this unit and the front and rear wheels on one side only of the trolley such that these two wheels only are driven and at the same speed as one another.

2. A trolley comprising a substantially rectangular chassis or platform supported at each end upon a pair of steered road wheels, an operative connection for imparting the appropriate steering movement from a wheel at one end of the trolley to its associated wheel at the same end, an operative connection between each wheel at one end of the trolley and the wheel at the other end of the trolley and on the same side thereof such that the said two wheels on the same side of the trolley have similar steering movements but in the opposite rotational direction, a single power unit and a positive driving connection between this unit and the front and rear wheels on one side only of the trolley such that these two wheels only are driven and at the same speed.

3. A trolley as claimed in claim 1 in which the power unit comprises an internal combustion engine including a change-speed gear and clutch, a horizontally extending driven shaft positively geared to the road wheels on one side only of the trolley, and a vertical transmission shaft connecting the engine-driven shaft through the clutch to the horizontal driven shaft.

4. A trolley as claimed in claim 2 in which the power unit comprises an internal combustion engine including a change-speed gear and clutch, a horizontally extending driven shaft positively geared to the road wheels on one side only of the trolley, and a vertical transmission shaft connecting the engine-driven shaft through the clutch to the horizontal driven shaft.

5. A trolley as claimed in claim 2, wherein the operative connection between the steered wheels includes elliptical cams.

ANTONY SCOTT STOKES.

REFERENCES CITED

The following references are of record in the file of this patent:

UNITED STATES PATENTS

| Number | Name | Date |
|---|---|---|
| 1,621,856 | Sedgwick | Mar. 22, 1927 |
| 1,369,709 | Schuman | Feb. 22, 1921 |
| 1,382,909 | Hennessy et al. | June 28, 1921 |
| 875,893 | Buckwalter | Jan. 7, 1908 |
| 1,255,775 | Mueller | Feb. 5, 1918 |

FOREIGN PATENTS

| Number | Country | Date |
|---|---|---|
| 136,391 | Great Britain | Dec. 18, 1919 |
| 560,112 | Great Britain | Mar. 21, 1944 |